(12) United States Patent
Murray et al.

(10) Patent No.: US 12,068,933 B2
(45) Date of Patent: Aug. 20, 2024

(54) LAUNCHER APPLICATION WITH CONNECTIVITY DETECTION FOR SHARED MOBILE DEVICES

(71) Applicant: VMware LLC, Palo Alto, CA (US)

(72) Inventors: Kevin Murray, Palo Alto, CA (US); Vishak Manjunath, Bangalore (IN); Neelabh Parui, Bangalore (IN); Akash Pati, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/048,342

(22) Filed: Oct. 20, 2022

(65) Prior Publication Data

US 2023/0061527 A1    Mar. 2, 2023

Related U.S. Application Data

(63) Continuation of application No. 17/221,901, filed on Apr. 5, 2021, now Pat. No. 11,483,221.

(30) Foreign Application Priority Data

Jan. 27, 2021    (IN) .............................. 202141003689

(51) Int. Cl.
*H04L 43/0811* (2022.01)
*H04L 43/04* (2022.01)
*H04L 43/06* (2022.01)
*H04L 67/63* (2022.01)
*H04L 9/40* (2022.01)

(52) U.S. Cl.
CPC .......... *H04L 43/0811* (2013.01); *H04L 43/04* (2013.01); *H04L 43/06* (2013.01); *H04L 67/63* (2022.05); *H04L 63/205* (2013.01)

(58) Field of Classification Search
CPC ..... H04L 43/0811; H04L 43/04; H04L 43/06; H04L 67/63; H04L 63/205; H04L 41/0806; H04L 63/101; H04L 63/20; H04L 67/04; H04L 67/10; H04W 12/047
See application file for complete search history.

(56) References Cited

U.S. PATENT DOCUMENTS

| | | | | |
|---|---|---|---|---|
| 9,910,663 B1* | 3/2018 | Biear | ....................... | H04L 67/34 |
| 10,439,921 B1* | 10/2019 | Dubey | .................... | H04L 67/10 726/1 |
| 2015/0032714 A1* | 1/2015 | Simhon | ................. | G06F 16/951 707/706 |
| 2015/0341367 A1* | 11/2015 | Kus | ......................... | H04L 67/10 726/1 |
| 2016/0234092 A1* | 8/2016 | Avery | .................... | H04L 45/306 |
| 2017/0279971 A1* | 9/2017 | Raleigh | ................... | H04L 12/14 |
| 2020/0112497 A1* | 4/2020 | Yenumulapalli | ........ | H04L 43/10 |

* cited by examiner

*Primary Examiner* — Patrice L Winder
(74) *Attorney, Agent, or Firm* — Kim & Stewart LLP

(57) ABSTRACT

Disclosed are approaches for a launcher application with connectivity detection for shared mobile devices. In some examples, among others, a management service component, a client device component, an enterprise environment component, or other connectivity endpoints associated with a plurality of applications can be identified. At least one response to requests transmitted to the connectivity endpoints can be received. A mode of connectivity can be determined based on the response. An application which is launchable in the mode of connectivity can be launched in an instance in which a selectable representation for the application is selected in a user interface.

20 Claims, 8 Drawing Sheets

LAUNCHER APPLICATION WITH CONNECTIVITY DETECTION FOR SHARED MOBILE DEVICES

RELATED APPLICATIONS

This application is a continuation of and claims the benefit of U.S. patent application Ser. No. 17/221,901, entitled "LAUNCHER APPLICATION WITH CONNECTIVITY DETECTION FOR SHARED MOBILE DEVICES," and filed Apr. 5, 2021, which claims benefit under 35 U.S.C. 119(a)-(d) to Foreign Application Serial No. 202141003689 filed in India entitled "LAUNCHER APPLICATION WITH CONNECTIVITY DETECTION FOR SHARED MOBILE DEVICES", on Jan. 27, 2021, by VMware, Inc., which are hereby incorporated by reference in their entireties.

BACKGROUND

In an enterprise environment, administrators may be tasked with enforcing security policies of the enterprise on client devices, such as smartphones, tablets, and laptops. A management system can enable the administrator to provision applications to the client devices and control operation of the client devices such that access to enterprise data is secured on the client device.

Some management services provide a launcher application used to launch applications in a network environment and to add or remove applications from an interface available to the user. A user can provide his or her credentials to the interface to allow the user to be authenticated through the launcher application. In many cases, authentication of the user and launching of the applications in the network environment can include a data communication flow involving network infrastructure, directory services, identity providers, network tunnels, and other endpoints. If whichever flow that is in use fails, the client device may be seen as essentially unusable, even if the client device may have network access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
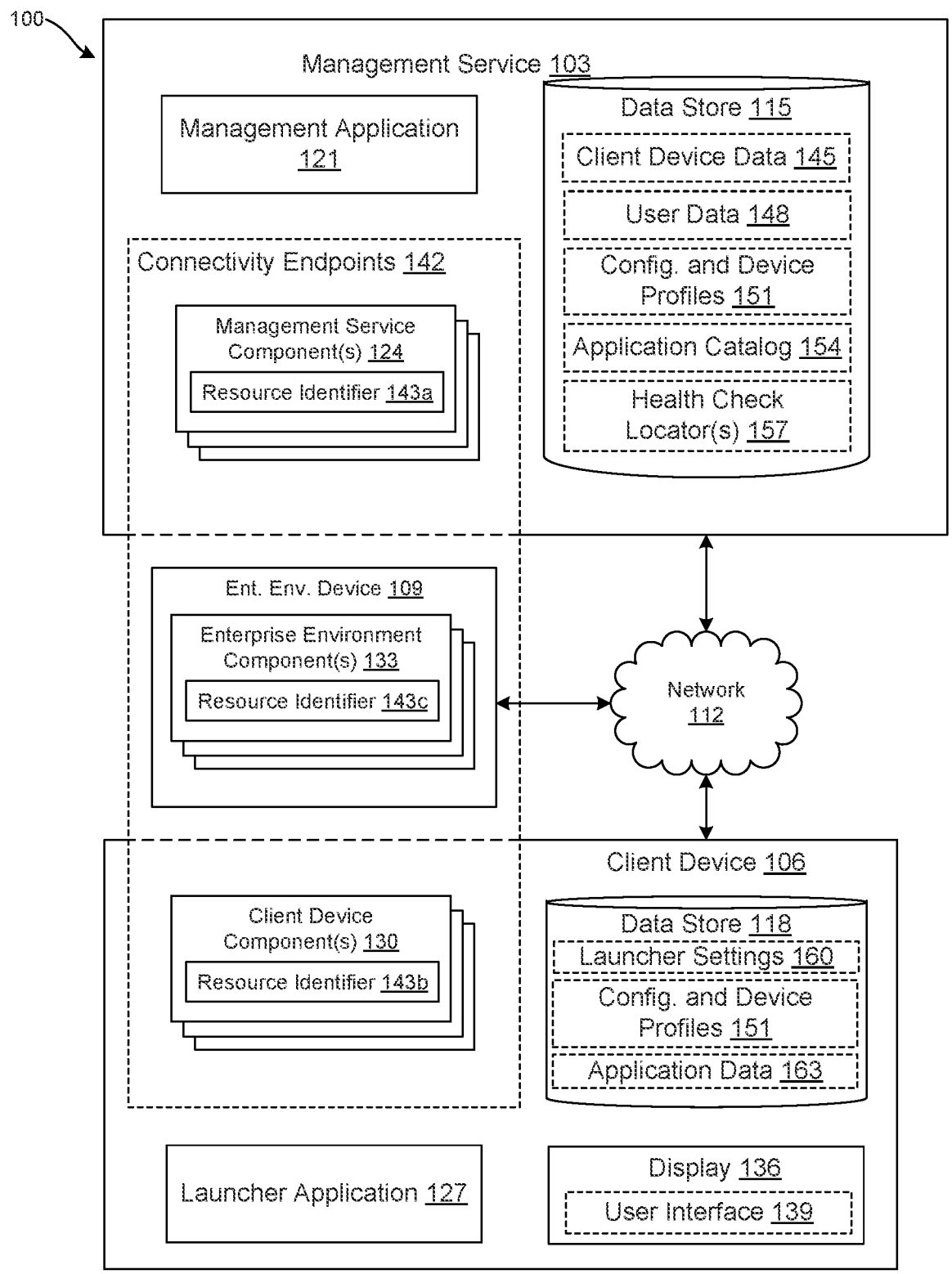
FIG. 1 is a drawing of an example of a network environment according to various embodiments of the present disclosure.

The present disclosure relates to a "launcher application" with connectivity detection for mobile devices which can be shared among users. A management service can push the launcher application to the mobile device, and configure the mobile device to use the launcher application instead of (or in addition to) a device interface or default launcher application of the mobile device.

The launcher application enables mobile devices to be provisioned for various enterprise environments (e.g., corporate, retail, education, healthcare) while customizing the look and behavior of the mobile devices. For example, in a retail environment, the launcher application can lock the mobile device into a single application with no access to other features or settings. Users can browse store products or place food orders without employee interaction. In an education environment, the launcher application can launch a single education or research application for students to use while in class. The launcher application can prevent students from navigating to unauthorized network pages or downloading more applications onto mobile devices. In a healthcare environment, the launcher application can enable mobile devices to be loaned with whitelisted applications for patient-use, such as games and entertainment apps. Phone features can be enabled and an address book customized with important hospital contact information.

Some launcher applications can enable a "Check-in/Check-out" use case for a mobile device running the Android® operating system. The mobile device can be locked into a login screen awaiting the user to provide his or her credentials to a user interface rendered by the launcher application. Upon receiving the credentials, the launcher application would then reach out to the management service to authenticate the user, assign the mobile device to the right user, and serve the correct configuration to the mobile device based on the assignment to that user.

The steps and systems involved with performing an authentication of a user can vary. For example, authentication can be performed against one computing device or identity provider, resulting in a fairly straightforward process. In many other cases, the authentication may need to be redirected to or performed with a directory service (e.g., using the Lightweight Directory Access Protocol or LDAP), or may need to be federated to any number of identity provider (IdP) services.

If whichever flow that is in use fails, the mobile device may be seen as essentially unusable, even if the mobile device itself may have internet access. For example, Active Directory (AD) may be down in the enterprise environment, but to the user of the mobile device, the console of the management service, and an enterprise connector (e.g., a tunnel to enterprise applications) may all be up and running. In this mode of connectivity, the mobile device may not appear useful since the login cannot be completed and configurations or settings cannot be delivered to the launcher application.

Examples of this disclosure can provide a launcher application that can detect a mode of connectivity to a configurable set of connectivity endpoints. The connectivity endpoints can include components of the management service, the client device that executes the launcher application, or an enterprise environment device, or other components that are executable by a computing device and associated with a connectivity for one or more applications that can be launched within a network environment. In the following discussion, examples of systems and their components are described, followed by examples of the operation of those systems.

With reference to FIG. 1, shown is an example of a network environment 100. FIG. 1 shows that the network environment 100 can include a management service 103, a client device 106, and one or more enterprise environment device(s) 109 in data communication over a network 112. The network 112 can include the internet, one or more intranets, extranets, wide area networks (WANs), local area networks (LANs), wired networks, wireless networks, or any combination of two or more such networks. The network 112 can include satellite networks, cable networks, Ethernet networks, cellular networks, and telephony networks.

The management service 103 can include a server computer or any other system providing computing capability. Alternatively, the management service 103 can include a plurality of computing devices that are arranged, for example, in one or more server banks, computer banks, or other arrangements. The management service 103 can include a grid computing resource or any other distributed computing arrangement. The computing devices can be located in a single installation or can be distributed among many different geographical locations. The management service 103 can also include or be operated as one or more virtualized computer instances. For purposes of convenience, the management service 103 is referred to in the singular. Even though the management service 103 is referred to in the singular, it is understood that a plurality of management services 103 can be employed in the various arrangements as described above.

In some examples, an enterprise, such as one or more organizations, can operate the management service 103 to oversee or manage the operation of the client devices 106 of its employees, contractors, customers, students, or other users having user accounts with the enterprise. The enterprise can have a hierarchy or organizational structure that links the individuals and/or groups in the enterprise. For example, an individual or group can be responsible for management of one or more subordinate individuals or groups, who can in turn be responsible for management of one or more subordinate individuals or groups, and so on.

The client device 106 is representative of any one or more client devices 106. The client device 106 can include a processor-based system, such as a computer system, that can include a desktop computer, a speaker system, a laptop computer, a personal digital assistant, a cellular telephone, a smartphone, a set-top box, a tablet computer system, an IoT device, or any other device with like capability. The enterprise environment device 109 is representative of any one or more server computers or any other systems providing computing capability.

Also, data can be stored in a data store 115 and a data store 118 that can be accessible to the management service 103 and the client device 106, respectively. The data store 115 or the data store 118 can be representative of a plurality of data stores 115 or data stores 118. The data stored in the data store 115 or the data store 118 can be associated with the operation of the applications or functional entities as further described below.

Applications or other functionality can be executed in the network environment 100 according to examples. The management service 103 can include a management application 121 that can be executed to generate a console or other user interface that can allow administrators and other users to operate and interact with the management service 103. The console of the management service 103 can allow settings for the launcher application 127 to be configured by an administrator user and conveyed to the client device 106.

The client device 106 can execute the launcher application 127 for individual, group, or enterprise use cases. The launcher application 127 can also customize the look and behavior of operations of the client device 106. In this way, the launcher application 127 can be executed to check out the client device 106 to a particular user prior to launching enterprise applications, browser applications, and other applications. The enterprise environment device 109 can execute one or more enterprise environment component(s) 133. The management service 103, the client device 106, and/or the enterprise environment device 109 can also execute other applications, services, processes, systems, engines, or functionality not discussed in detail herein.

The management service 103 can cause various software to be installed or features to be configured on the client device 106. Software can include, for example, the launcher application 127, one or more client device component(s) 130, an operating system or operating system updates, resources, libraries, drivers, or other similar components that require installation on the client device 106. The management service 103 can cause policies to be implemented on the client device 106 by way of a user or device profile. Policies can include, for example, restrictions or permissions pertaining to capabilities of the client device 106 such that access to enterprise data is secured on the client device 106. In one example, the policies can include a restriction that one or more screen lock settings of the client device 106 be configured to help secure the client device 106. The screen lock settings can include a pattern, Personal Identification Number (PIN), password, or other attribute that can be used to unlock the client device 106.

The client device 106 can include output devices such as audio speakers and a display 136 upon which user interface(s) 139 generated by the launcher application 127, the client device component 130, or another application can be rendered. The display 136 can include liquid crystal display (LCD) displays, gas plasma-based flat panel displays, organic light emitting diode (OLED) displays, electrophoretic ink (E-ink) displays, LCD projectors, or other types of display devices, etc. The client device 106 can include one or more input devices, such as a mouse, keyboard, touch pad, or touch screen, which facilitate a user interacting with the launcher application 127 or controlling the client device 106.

FIG. 1 depicts that the network environment 100 can include connectivity endpoints 142, such as the management service components 124, the client device components 130, the enterprise environment components 133, and other components that are executable by a computing device and associated with at least one connectivity for a plurality of applications that can be launched within the network environment 100. Applications can include enterprise applications, browser applications, device management applications, social networking applications, word processors, spreadsheet applications, media viewing applications, and other applications.

As the connectivity endpoints 142 can be associated with at least one connectivity for the plurality of applications, the connectivity endpoints 142 can also be associated with launching the applications given various modes of connectivity. For example, some applications may not properly launch when the management service 103 is unavailable, or when data communication between the client device 106 and the management service component(s) 124 is restricted or unavailable.

The management service component(s) 124 can be executed to support or perform various operations of the management service 103, including to communicate with the client devices 106. In one example, the management service component(s) 124 can include device services that provide a command queue or other processes involved in receiving from and transmitting to the client devices 106. The management application 121 can store commands and other suitable content in the command queue associated with a particular client device 106 to control various aspects of the launcher application 127 or its associated connectivity determinations for the particular client device 106. The launcher application 127 or one of the client device component(s) 130 can receive a command configured to cause the client device 106 to obtain settings associated with launching applications in the network environment 100. In another example, the management service component(s) 124 can include an access manager or identity provider that provides multi-factor authentication, conditional access or single sign-on to systems and applications in the network environment 100.

The client device component(s) 130 can be executed to implement at least one interface between the launcher application 127 and other applications, services, processes, systems, engines, or functionality executable by a computing device. The client device component(s) 130 can include a first client device component 130 that is an Application Programming Interface (API) provided by a software development kit (SDK) that gives the launcher application 127 access to functionality of the management service 103 including Mobile Device Management (MDM) or Unified Endpoint Management (UEM) functionality. This functionality can include device management, application management, and content management capabilities, all of which can be controlled or directed from the management application 121.

The client device component(s) 130 can include a second client device component 130 that is associated with Android®, Android Enterprise™, Android for Work™ or other framework provided by an operating system that allows the client device 106 to be enrolled with the management service 103 so that the client device 106, or at least certain portions or certain data partitions on the client device 106, can be managed by the management service 103.

The client device component(s) 130 can include a third client device component 130 that is a management component that monitors or manages at least a portion of the data, applications, or hardware components for the client device 106. The management component can also identify whether the client device 106 is operating in accordance with the policies that have been assigned to the client device 106. In some examples, the management component can function as a portion of an operating system for the client device 106.

In other examples, the client device component(s) 130 can be incorporated into the launcher application 127. Alternatively, the client device component(s) 130 can be a portion of an application that was developed, for example, using a Software Development Kit (SDK) that facilitates the inclusion of functionality within the application that monitors or manages at least a portion of the resources for the client device 106.

The enterprise environment component(s) 133 can be executed to provide the management service 103 with data communication via the network 112 to one or more applications, services, processes, systems, engines, or functionality for an enterprise environment. Some examples of the enterprise environment component(s) 133 include an enterprise connector that provides a virtual private network (VPN) or tunnel connection to the enterprise environment. The enterprise environment can include on-premises infrastructure or any other infrastructure of a particular enterprise that operates the management service 103.

Additionally, the enterprise environment component(s) 133 can be an enterprise access connector that is executed to integrate on-premises infrastructure such as Active Directory™, RADIUS™, and RSA™ SecurID™ to provide directory integration and user authentication. In another example, the enterprise environment component(s) 133 can be representative of components of other infrastructure, or components of system availability, application availability, or other functionality related to the enterprise environment.

The management service components 124, the client device components 130, and the enterprise environment components 133, can be accessible via a resource identifier 143a, 143b, 143c, respectively. The resource identifiers 143a, 143b, 143c can be a Uniform Resource Identifier (URI) or other identifier that enables a health check to be performed over the network 112. The launcher application 127 can utilize the resource identifiers 143a . . . 143c to determine a mode of connectivity based at least in part on at least one response from a call to the resource identifiers 143a . . . 143c.

The mode of connectivity can be associated with a subset of the applications that are launchable by the launcher application 127 in the network environment 100. In some aspects, the subset of applications can be launchable when there is full connectivity, when at least one of the connectivity endpoints 142 is unavailable or not reporting, when network connectivity is unavailable or not reporting, or in some other instance associated with connectivity detection in the network environment 100. Full connectivity can be defined as connectivity to at least one of a set of connectivity endpoints 142. The set of connectivity endpoints 142 can be identified or designated by the management application 121. The mode of connectivity can be a value that represents at least one of: full connectivity, at least one management service component 124 unavailable or not reporting, at least one client device component 130 unavailable or not reporting, or at least one enterprise environment component 133 unavailable or not reporting. The value can also represent that Invalid Credentials have been supplied to the launcher application 127, or that data communication via the network 112 is unavailable or not reporting.

The data stored in the data store 115 accessible to the management service 103 can include client device data 145, user data 148, configuration and device profiles 151, application catalog 154, one or more health check locator(s) 157, and potentially other data. The client device data 145 can include a serial number, a media access control (MAC) address of a network interface card (NIC), manufacturer information, a Personal Identification Number (PIN) setup status, a status of Bluetooth®, camera or microphone functionality, or other information about the client device 106. The client device data 145 can indicate that the client device 106 is a mobile device running the Android® operating system.

The user data 148 can include identifying information about a user, authentication information about a user, and other user information. For example, user data 148 can include information about client devices 106 that are associated with a user account of the user, enterprise resources to which a particular user has access, such as email, calendar data, documents, media, applications, network sites, or other resources. The user data 148 can also identify one or more user groups of which a particular user is a member, which can in turn define the access rights of the user to one or more enterprise resources, as well as identify which applications should be deployed to a client device 106 associated with the user.

The configuration and device profiles 151 can include data about configuration profiles or device profiles that enable the client device 106 to be remotely managed by the management service 103 or locally managed by one of the client device components 130. Device profiles can comprise one or more indications of the state of client device 106. For instance, a device profile can represent hardware specifications of client device 106, version and configuration information of various software programs and hardware components installed on client device 106, data transmission protocols enabled on client device 106, version and usage information of various resources stored on client device 106, and/or any other attributes associated with the state of client device 106. The device profile can indicate a current location associated with client device 106 and/or a current time associated with client device 106. The device profile can, for example, comprise data accessible via functions of the client device 106, such as GPS location data, and/or via remote services communicatively coupled to client device 106, such as current time data provided by a remote time service.

Configuration profiles can include settings, plug-ins, configuration files and/or other data capable of configuring, controlling, and/or influencing the operations and/or functions of client device 106. Configuration profiles can specify how the client device 106 can perform certain functions of the client device 106, such as a camera, touchscreen, microphone, or other function provided by client device 106. Configuration profiles can, for example, comprise configuration profiles specific to Apple iOS™, Apple OSX™, Samsung KNOX™, Samsung SAFE™, Google Android™, Windows Mobile™, Windows™, Blackberry™, Symbian™, or other operating systems of the client device 106.

The configuration and device profiles 151 can assign a launcher profile as an "Offline" profile to a Staging User with an application layout, and associated launcher settings 160. The launcher settings 160 can configure authentication for the "Offline" profile (e.g., None, PIN, or Password). An administrator user can navigate a user interface of the management application 121 to generate the "Offline" profile. Once generated, the "Offline" profile can be stored in the data store 115 or sent to the client device 106 to be stored in the data store 118 as the configuration and device profiles 151. The launcher application 127 can provide access to the "Offline" profile, e.g., during periods of limited connectivity.

The application catalog 154 can include a plurality of selectable representations of applications, launch instructions for launching at least one of a subset of the applications, or other data about a catalog of selectable applications. The one or more health check locator(s) 157 can include data about a Uniform Resource Locator (URL) or other locator for performing a health check of at least one of the connectivity endpoints 142. In one example, the locator is associated with at least one of the resource identifiers 143*a* . . . 143*c*. A response can be received, from the locator, in an instance in which a health check of at least one of the connectivity endpoints 142 is performed to determine whether the at least one of the connectivity endpoints 142 is available, unavailable, or not reporting.

The data stored in the data store 118 accessible to the client device 106 can include launcher settings 160, configuration and device profiles 151, application data 163, and potentially other data. The launcher settings 160 can include settings that configure the launcher application 127 to launch a subset of the applications of the application catalog 154 in an instance in which the connectivity for the applications is determined. The settings can allow the launcher application 127 to be custom-tailored to meet the needs of an enterprise environment. The settings can configure the client device 106 with a custom home-screen, configure layout elements such as an icon grid and an orientation, add bookmarks, or add or remove applications from one or more profiles or configurations of launchable applications, and create folders that group applications together. The launcher settings 160 can indicate that the launcher application 127 should (or should not) require a passcode to protect operation of the launcher application 127. The passcode can for example be set to none, a Personal Identity Number (PIN), or a password.

The launcher settings 160 can include a staging profile (also referred to as a staging "configuration") of launchable applications. The staging profile can provide the launcher application 127 with a profile that includes a set of applications from the application catalog 154 which are applicable for the enterprise. Individual users can know which applications they need to use, and select and launch those applications from the launcher application 127 accordingly.

Additionally, the launcher settings 160 can include a default, enterprise, or group profile (also referred to as a default "configuration") of launchable applications. The staging configuration can be generated by an administrator user of the management service 103 to include a subset of launchable applications that can be launched depending on a mode of connectivity of the client device 106 (e.g., full connectivity, at least one of the connectivity endpoints 142 is unavailable or not reporting, or data communication via the network 112 is unavailable or not reporting).

The application data 163 can include data about the applications that are launchable by the launcher application 127. In some examples, the applications can be local applications that reside on the client device 106 such that the applications are launchable when data communication via the network 112 is unavailable or not reporting. Further, the applications can be applications that are launchable when there is full connectivity, or when at least one of the connectivity endpoints 142 is unavailable or not reporting.

Next, examples of the operation of the network environment 100 are described in further detail. FIGS. 2A-2E are respective drawings of a user interface 139 of the launcher application 127 according to various embodiments of the present disclosure. Beginning with FIG. 2A, the launcher application 127 can render the user interface 139 that is configured to receive an enterprise or group ID, a username, a password, or other information that can identify a particular user according to the user data 148 (FIG. 1). The user can select the user interface element 203 or continue element that, when selected, causes the launcher application 127 to proceed.

In addition to (or instead of) checking the network connectivity of the client device 106, the launcher application 127 can check for any error or determine a mode of connectivity suitable for launching applications. For example, if a network or server error is returned, the launcher application 127 can surface a default configuration for the launcher application 127 that was previously installed.

Figure 2A:
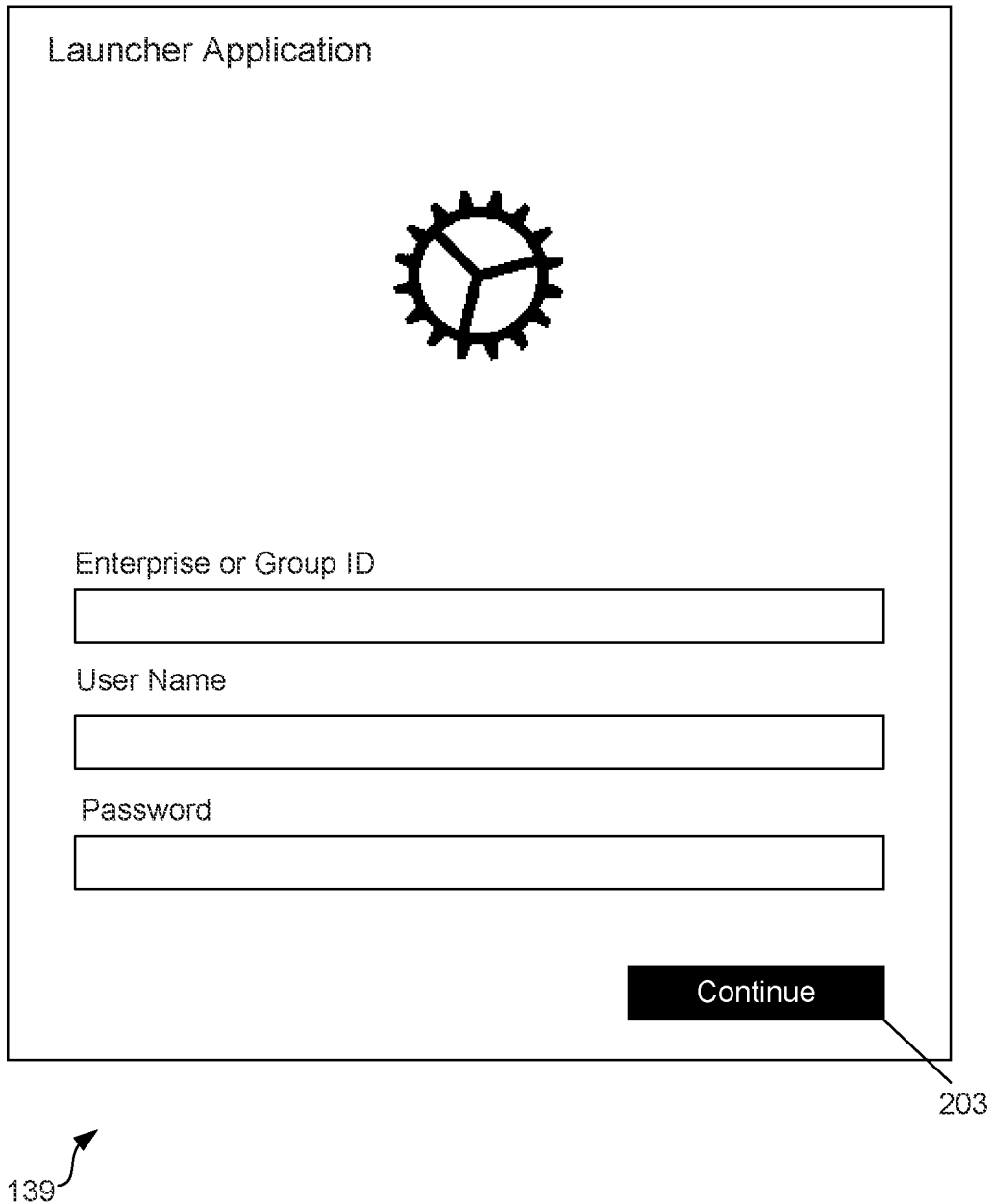
FIGS. 2A-2E are drawings of user interfaces of a launcher application according to various embodiments of the present disclosure.
Figure 2B:
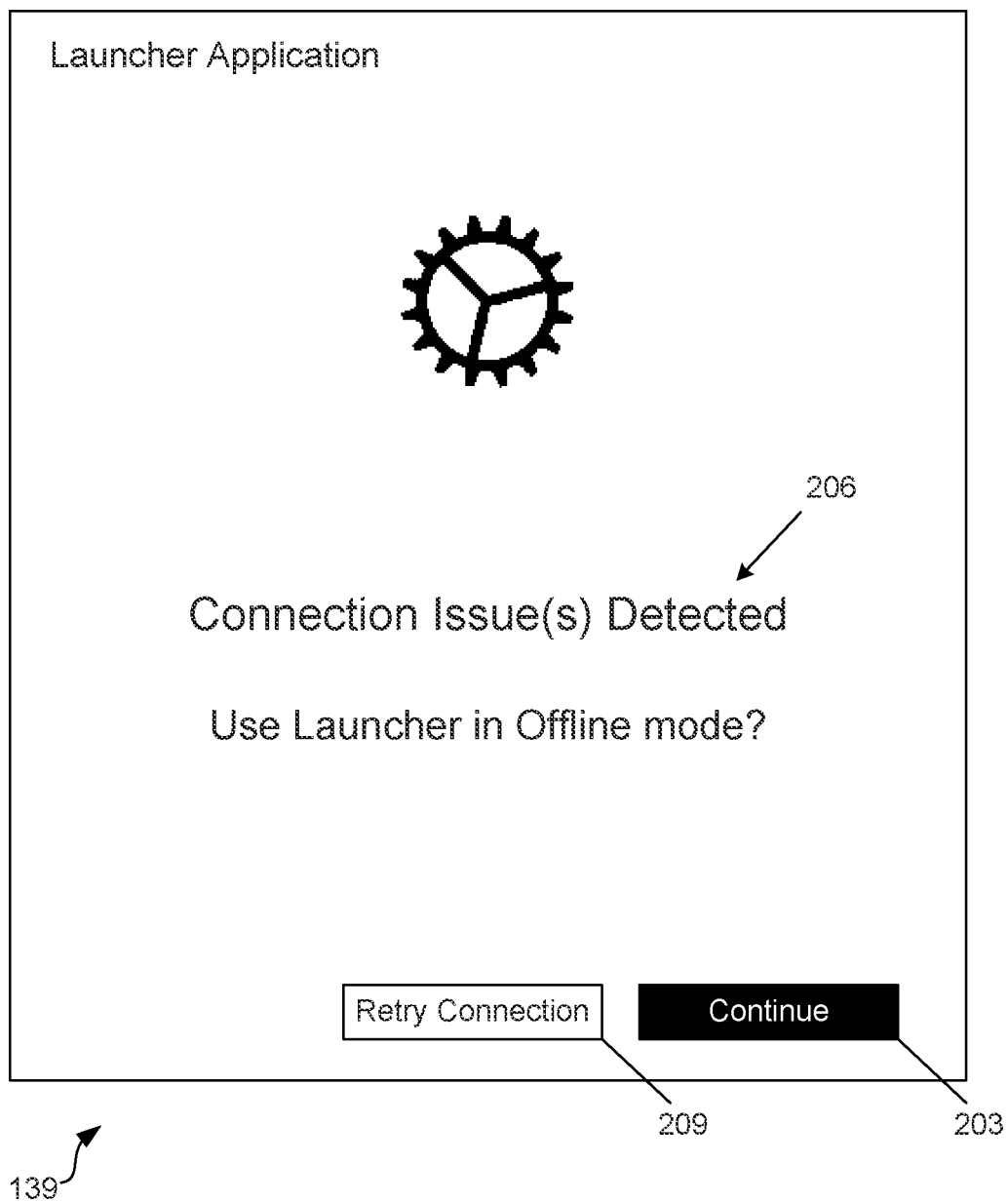

The user interface 139 of FIG. 2B shows that the launcher application 127 has determined at least one connectivity for a plurality of applications that can be launched by the launcher application 127. The launcher application 127 can in some examples present the Offline Mode if it notices an outage, to avoid the user needing to go through an error state first. The launcher application 127 has rendered the user interface element 203 in association with an indication 206 of a mode of the connectivity. In some examples, the user interface element 203 comprises the indication 206 of the mode of the connectivity. The indication 206 depicted in FIG. 2B includes text that states, "Connection Issue(s) Detected." There is also a retry connection element 209 that can, when selected, cause the launcher application 127 to retry the at least one connectivity for the plurality of applications that can be launched by the launcher application 127.

Figure 2C:
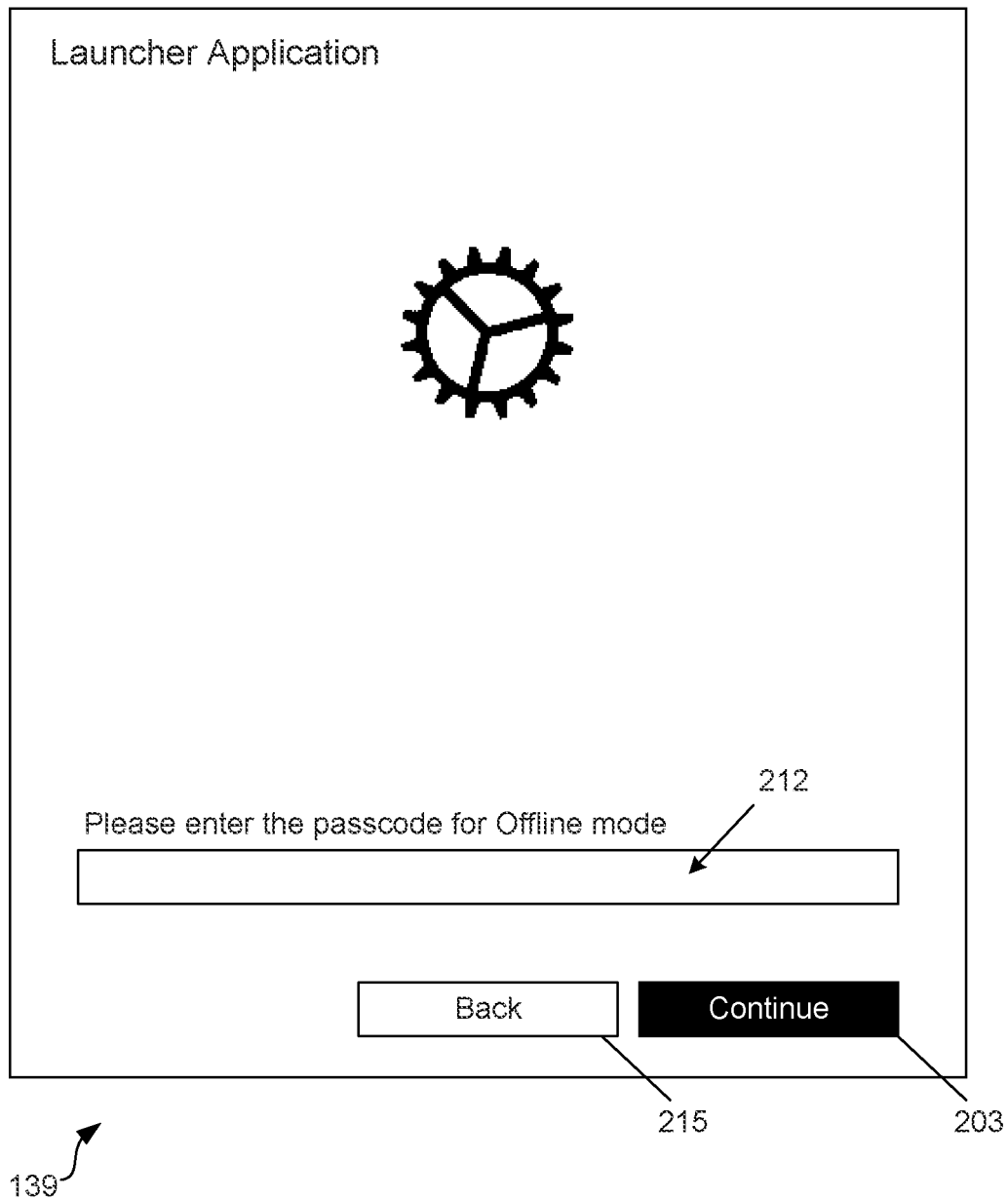

In FIG. 2C, the launcher application 127 has rendered the user interface 139 to include a field 212 for receiving a passcode. The launcher application 127 can be protected with a PIN to secure the default "configuration" or offline mode configuration of the launcher application 127. The user can input the passcode via the field 212. The user can also select the user interface element 203 or other user interface element that, when selected, causes the launcher application 127 to proceed. There is also a back element 215 that can, when selected, cause the launcher application 127 to return to the user interface 139 shown, e.g., in FIGS. 2A and 2B.

Figure 2D:
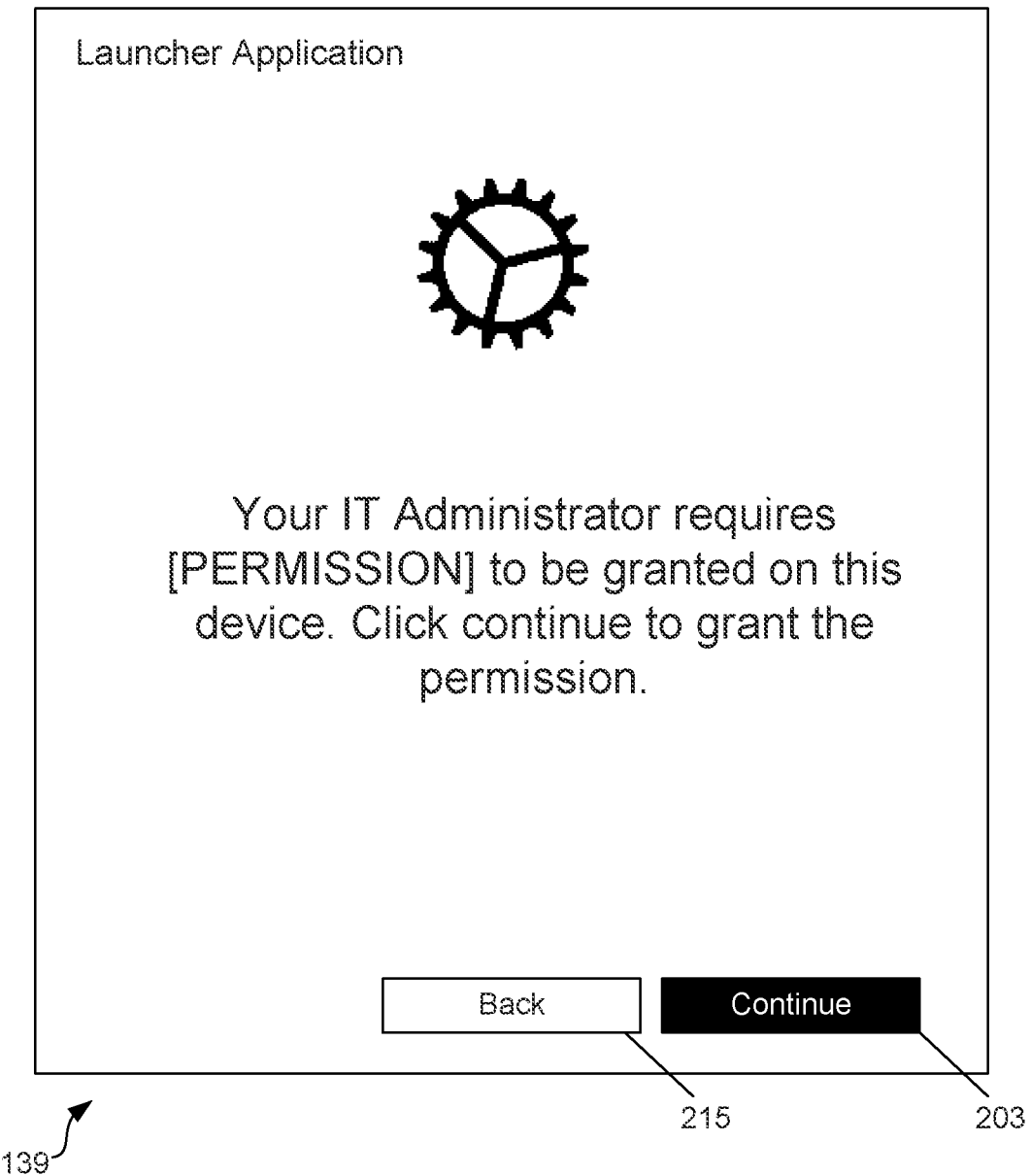

The user interface 139 of FIG. 2D shows that the launcher application 127 is configured to cause application permissions to be granted (or changed) on the client device 106. Application permissions can include Draw Over Other Apps, Location (ACCESS_COARSE_LOCATION and ACCESS_FINE_LOCATION), Phone, or other permissions. The Location permission can permit the launcher application 127 to find and join Wi-Fi networks. The Phone permission can permit the launcher application 127 to manage phone calls.

The launcher application 127 can reapply any existing passcode profiles for the client device 106 based on the launcher settings 160. For example, the launcher application 127 can apply a passcode profile and/or configure one or more screen lock settings of the client device 106 to help secure the client device 106. The screen lock settings can include a pattern, Personal Identification Number (PIN), password, or other attribute that can be used to unlock the client device 106.

Figure 2E:
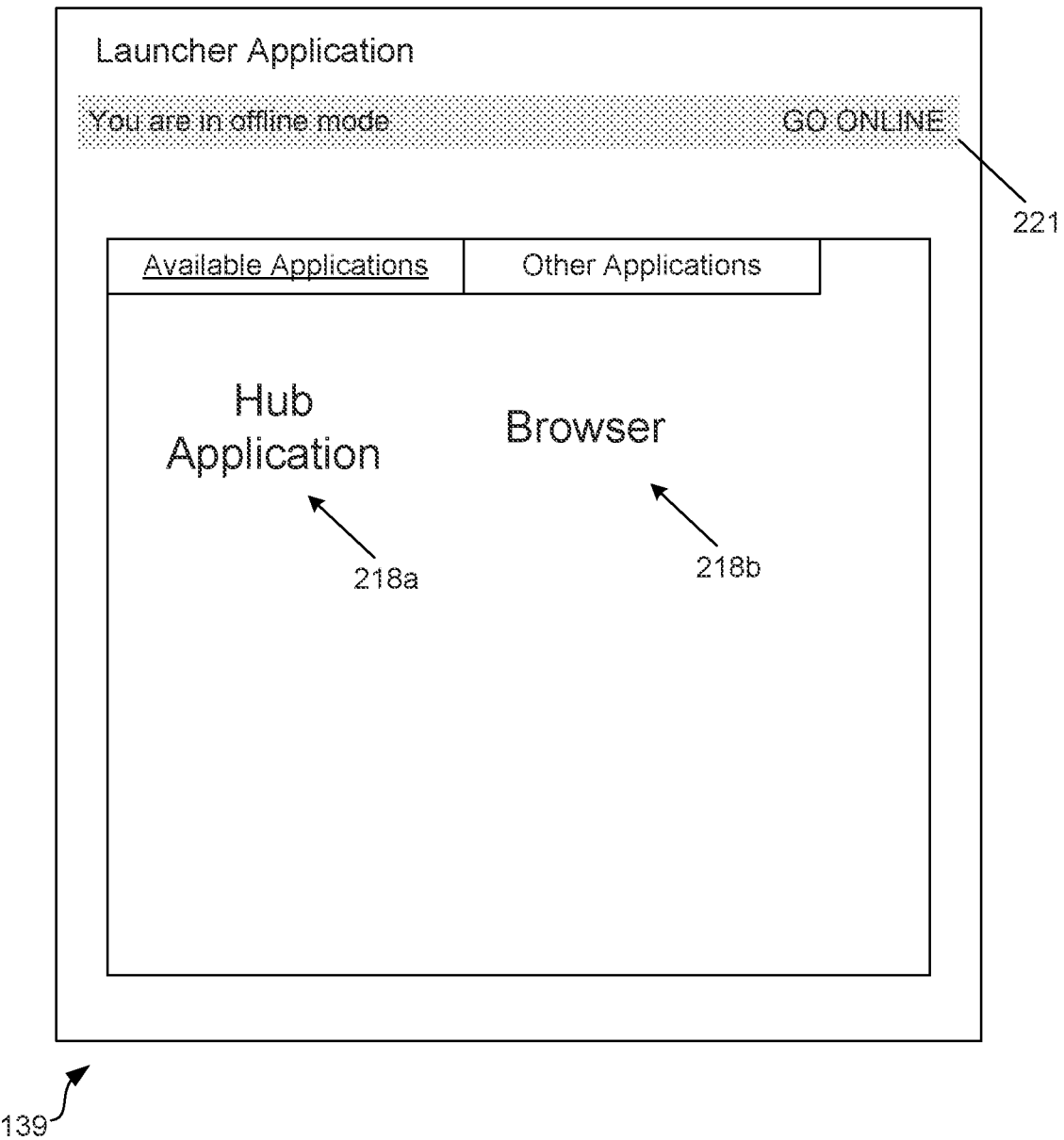

Next, FIG. 2E shows that the launcher application 127 can update the user interface 139 to include a plurality of selectable representations 218a, 218b of the subset of the applications. The subset of applications shown in FIG. 2E include a "Hub Application" and a "Browser" that are launchable by the launcher application 127 in the network environment 100. The subset of applications are launchable in a particular mode of connectivity (e.g., full connectivity, or when at least one of the connectivity endpoints 142 is unavailable or not reporting) as determined by the launcher application 127.

The launcher application 127 has determined that the subset of the applications is launchable in the mode of the connectivity, e.g., at least one management service component 124 unavailable or not reporting, at least one client device component 130 unavailable or not reporting, or at least one enterprise environment component 133 unavailable or not reporting. The launcher application 127 can render the plurality of selectable representations in a network page or network page element having text of "Available Applications" as shown in FIG. 2E. The launcher application 127 can launch at least one of the subset of applications represented by the selectable representations 218a, 218b in an instance in which one of the plurality of selectable representations is selected.

In some examples, the launcher application 127 can determine that one or more of the plurality of applications is not launchable in the mode of the connectivity. The selectable representations 218a, 218b do not include selectable representations for the one or more of the plurality of applications. In other words, the subset of the applications does not include the one or more applications that are not launchable in the mode of the connectivity. Continuing with this example, the launcher application 127 can render the network page or the network page tab having text of "Other Applications." The "Other Applications" network page can include any representations, whether selectable or not, for any of the plurality of applications associated with the application catalog 154 or the application data 163.

FIG. 2E depicts that while in "offline mode" using the default configuration, the launcher application 127 can render an online indication 221 such as an element comprising text of "Go Online" that allows the user to verify that the mode of connectivity has been restored. The online indication 221, when selected, can cause the launcher application 127 to retrieve a profile for the user from the configuration and device profiles 151 stored in the data store 115 (FIG. 1). The launcher application 127 can then use the downloaded configuration and determine to refrain from proceeding in "offline mode" using the default configuration. The launcher application 127 can clear the application data 163, clear the passcode or other settings of the launcher settings 160, and perform other suitable functionality for logging the user out of Offline mode.

Figure 3:
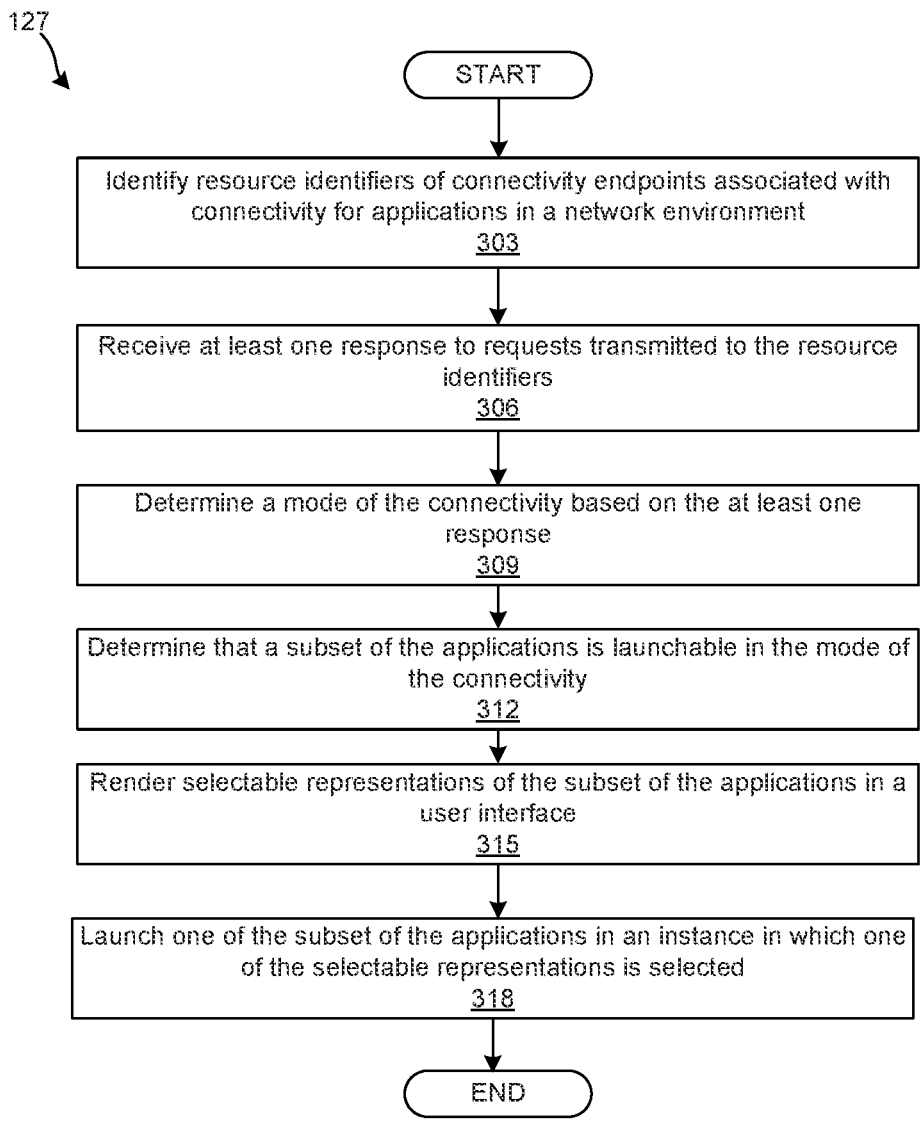
FIG. 3 is an example flowchart illustrating functionalities implemented by the launcher application according to various embodiments of the present disclosure.

FIG. 3 is an example flowchart illustrating functionalities implemented by the launcher application 127 according to various embodiments of the present disclosure. At box 303, the launcher application 127 can identify a plurality of connectivity endpoints 142 comprising resource identifiers 143a, 143b, or 143c. The connectivity endpoints 142 can be associated with at least one connectivity for a plurality of applications that can be launched within the network environment 100. The applications can be associated with the application catalog 154 and/or the application data 163 depicted in FIG. 1

At box 306, the launcher application 127 receives at least one response to a plurality of requests transmitted to the resource identifiers 143a, 143b, or 143c. In some examples, the launcher application 127 and/or the client device 106 transmitted the plurality of requests to health check locators 157 which are associated with the resource identifiers 143a, 143b, or 143c.

At box 309, the launcher application 127 can determine a mode of the connectivity based at least in part on the at least one response received at box 306. The mode of the connectivity can be based at least in part on determining whether a predefined response code is present in the at least one response received from one of the health check locators 157.

At box 312, the launcher application 127 determines that a subset of the applications is launchable in the mode of the connectivity. The launcher application 127 can determine that the subset of the applications is launchable in the mode of the connectivity, for example, based at least in part on application data 163 of the subset of the applications comprising at least one association with the mode of the connectivity.

The launcher application 127 can also determine that at least one of the plurality of applications is not launchable in the mode of the connectivity. In this example, the subset of the applications does not include the at least one of the plurality of applications that is not launchable in the mode of the connectivity.

At box 315, the launcher application 127 can render a plurality of selectable representations 218a, 218b (FIG. 2E) of the subset of the applications in a user interface 139 generated by the client device 106. In some examples, the launcher application 127 renders, in the user interface 139, a user interface element 203 (FIG. 2B) comprising an indication of the mode of the connectivity. In an instance in which the user interface element 203 (FIG. 2B) is selected, the launcher application 127 can update the user interface 139 to include the plurality of selectable representations 218a, 218b (FIG. 2E) of the subset of the applications.

At box 318, the launcher application 127 can launch one of the subset of the applications in an instance in which one of the plurality of selectable representations 218a, 218b (FIG. 2E) rendered in the user interface 139 is selected. Thereafter, the process can proceed to completion.

Figure 4:
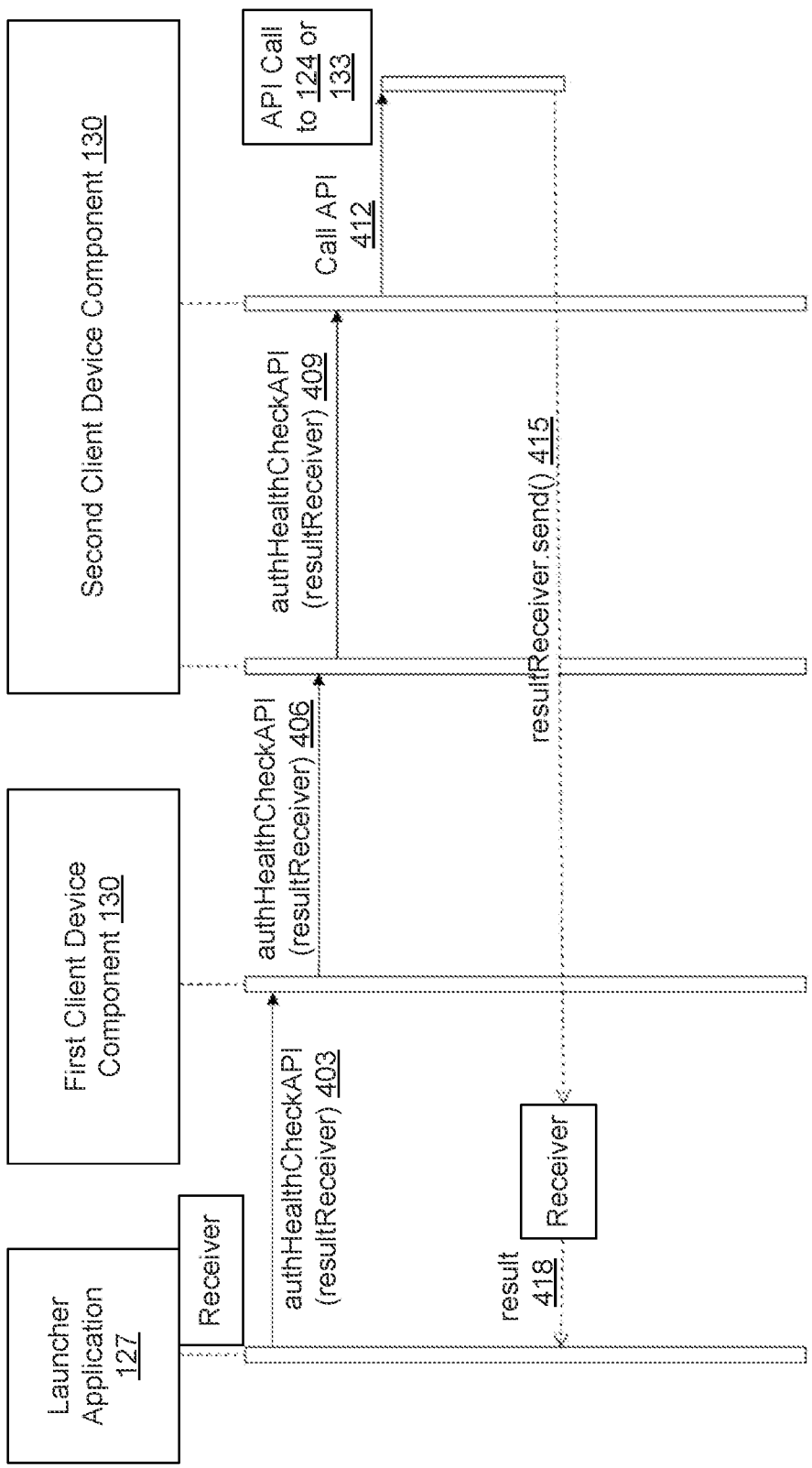
FIG. 4 is a sequence diagram illustrating examples of interaction between the launcher application and connectivity endpoints according to various embodiments of the present disclosure.

FIG. 4 is a sequence diagram illustrating examples of interaction between the launcher application 127 and the connectivity endpoints 142 according to various embodiments of the present disclosure. The launcher application 127 can be executed to invoke and consume one or more interfaces for performing a health check of at least one of a plurality of connectivity endpoints 142 comprising a first client device component 130, a second client device component 130, a management service component 124, and an enterprise environment component 133.

In some examples, the launcher application 127 can use the launcher settings 160 to identify the plurality of connectivity endpoints 142 comprising resource identifiers 143a, 143b, and 143c. The launcher settings 160 can also include one of more of the health check locators 157 for performing the health check.

At step 403 in FIG. 4, the launcher application 127 can instantiate a receiver that can send a request out through the first client device component 130 and the second client device component 130 (e.g., via locators for the resource identifier 143b). The example of FIG. 4 shows the receiver has sent out the request which is received by the first client device component 130. At step 406, the first client device component 130 sends a request which is received by the second client component 130. At step 409, the second client component 130 has received the request from step 406 and has proceeded to invoke a method or other feature of the second client component 130 that can make a call to an Application Programming Interface (API). At step 412, the second client device component 130 can perform the health check by causing the client device 106 to transmit a request to at least one interface of the management service component 124 or the enterprise environment component 133. Any (or all) of the interfaces for the health check, including interfaces of the management service component(s) 124, the client device component(s) 130, or the enterprise environment component(s) 133 can be executed asynchronously by the launcher application 127. At step 415, the launcher application 127 can consume the interface(s), for example to receive an asynchronous response associated with the call performed at step 412. In some examples, the launcher application 127 can implement a ResultReceiver callback to consume the interface(s).

At step 418, the "result" depicted in FIG. 4 shows that the receiver of the launcher application 127 can receive at least one response to a plurality of requests the client device 106 transmitted to the resource identifiers 143a . . . 143c (FIG. 1). In some examples, the launcher application 127 can determine, based at least in part on the response, that at least one of the connectivity endpoints 142 is unavailable or not reporting. Thereafter, the process can proceed to completion.

In some other examples, the launcher application 127 can determine, based at least in part on a lack of response, that at least one of the connectivity endpoints 142 is unavailable or not reporting. For example, the launcher application 127 can use a predefined threshold defined within the launcher settings 160 to determine that the at least one of the connectivity endpoints 142 is unavailable or not reporting.

The management service 103, client device 106, the enterprise environment device 109 and other computing devices can include at least one processor circuit, for example, having a processor and at least one memory device, both of which couple to a local interface, respectively. The client device 106 can include, for example, at least one computer, a mobile device, smartphone, a table computer, a speaker system, a personal assistant device, a computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The management application 121, the launcher application 127, the connectivity endpoints 142, and other various services and functions described can be embodied in software or code executed by general purpose hardware as discussed above. As an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowchart show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method, comprising:
    identifying, by a computing device, a plurality of connectivity endpoints associated with respective uniform resource identifiers (URI's), the connectivity endpoints associated with at least one connectivity for a plurality of applications that can be launched within a network environment;
    generating, by the computing device, a plurality of health checks relating to the plurality of connectivity endpoints, the health checks performed by accessing the respective URI's associated with the plurality of connectivity endpoints, wherein each respective URI includes a health check locator for performing a respective health check of a respective connectivity endpoint, wherein the respective health check is generated by identifying a response to accessing the respective URI's health check locator, the response indicating whether a respective endpoint is available;
    receiving, by the computing device, at least one response to the plurality of health checks;
    determining, by the computing device, a mode of connectivity of the computing device based at least in part on the at least one response, wherein the mode of connectivity is a value indicating at least one of: full connectivity, or at least one connectivity endpoint of the plurality of endpoints not reporting;
    determining, by the computing device, that a subset of the plurality of applications is launchable in the mode of connectivity;
    determining, by the computing device, that another subset of the plurality of applications is not launchable in the mode of connectivity; and
    launching, by the computing device, one of the subset of the plurality of applications in an instance in which one of a plurality of selectable representations of the subset of the plurality of applications is selected in a user interface generated by the computing device, wherein the another subset of the plurality of applications is not rendered in the user interface.

2. The method of claim 1, further comprising:
    rendering, by the computing device and in the user interface, a user interface element comprising an indication of the mode of connectivity; and
    in an instance in which the user interface element is selected, updating the user interface to include the plurality of selectable representations of the subset of the plurality of applications.

3. The method of claim 1, further comprising:
    determining, by the computing device, that at least one of the plurality of applications is not launchable in the mode of connectivity;
    wherein the subset of the plurality of applications does not include the at least one of the plurality of applications.

4. The method of claim 1, further comprising:
    receiving, by the computing device, a command configured to cause the computing device to obtain launcher settings associated with launching the plurality of applications;
    wherein the launcher settings comprise a passcode the computing device uses to secure an offline mode configuration of the computing device.

5. The method of claim 1,
    wherein the computing device transmitted a plurality of requests to the health check locators.

6. The method of claim 5, wherein determining the mode of connectivity is based at least in part on determining whether a response code is present in the at least one response received from one of the health check locators.

7. The method of claim 1, wherein determining that the subset of the plurality of applications is launchable in the mode of connectivity is based at least in part on application data of the subset of the plurality of applications comprising at least one association with the mode of connectivity.

8. A system, comprising:
at least one computing device; and
program instructions executable in the at least one computing device that, when executed by the at least one computing device, cause the at least one computing device to:
identify a plurality of connectivity endpoints associated with respective uniform resource identifiers (URI's), the connectivity endpoints associated with at least one connectivity for a plurality of applications that can be launched within a network environment;
generate a plurality of health checks relating to the plurality of connectivity endpoints, the health checks performed by accessing the respective URI's associated with the plurality of connectivity endpoints, wherein each respective URI includes a health check locator for performing a respective health check of a respective connectivity endpoint, wherein the respective health check is generated by identifying a response to accessing the respective URI's health check locator, the response indicating whether a respective endpoint is available;
receive at least one response to the plurality of health checks;
determine a mode of connectivity based at least in part on the at least one response, wherein the mode of connectivity is a value indicating at least one of: full connectivity, or at least one connectivity endpoint of the plurality of endpoints not reporting;
determine that a subset of the plurality of applications is launchable in the mode of connectivity;
determine that another subset of the plurality of applications is not launchable in the mode of connectivity; and
launch one of the subset of the plurality of applications in an instance in which one of a plurality of selectable representations of the subset of the plurality of applications is selected in a user interface generated by the at least one computing device, wherein the another subset of the plurality of applications is not rendered in the user interface.

9. The system of claim 8, wherein the program instructions cause the computing device to:
render, in the user interface, a user interface element comprising an indication of the mode of connectivity; and
in an instance in which the user interface element is selected, update the user interface to include the plurality of selectable representations of the subset of the plurality of applications.

10. The system of claim 8, wherein the program instructions cause the computing device to:
determine that at least one of the plurality of applications is not launchable in the mode of connectivity;
wherein the subset of the plurality of applications does not include the at least one of the plurality of applications.

11. The system of claim 8, wherein the program instructions cause the computing device to:
receive a command configured to cause the computing device to obtain launcher settings associated with launching the plurality of applications;
wherein the launcher settings comprise a passcode the computing device uses to secure an offline mode configuration of the computing device.

12. The system of claim 8,
wherein the program instructions cause the computing device to transmit a plurality of requests to the health check locators.

13. The system of claim 12, wherein the computing device determines the mode of connectivity based at least in part on determining whether a response code is present in the at least one response received from one of the health check locators.

14. The system of claim 8, wherein the computing device determines that the subset of the plurality of applications is launchable in the mode of connectivity is based at least in part on application data of the subset of the plurality of applications comprising at least one association with the mode of connectivity.

15. A non-transitory computer-readable medium storing a plurality of instructions executable by a computing device, the plurality of instructions being configured to cause the computing device to at least:
identify a plurality of connectivity endpoints associated with respective uniform resource identifiers (URI's), the connectivity endpoints associated with at least one connectivity for a plurality of applications that can be launched within a network environment;
generate a plurality of health checks relating to the plurality of connectivity endpoints, the health checks performed by accessing the respective URI's associated with the plurality of connectivity endpoints, wherein each respective URI includes a health check locator for performing a respective health check of a respective connectivity endpoint, wherein the respective health check is generated by identifying a response to accessing the respective URI's health check locator, the response indicating whether a respective endpoint is available;
receive at least one response to the plurality of health checks;
determine a mode of connectivity based at least in part on the at least one response, wherein the mode of connectivity is a value indicating at least one of: full connectivity, or at least one connectivity endpoint of the plurality of endpoints not reporting;
determine that a subset of the plurality of applications is launchable in the mode of connectivity;
determine that another subset of the plurality of applications is not launchable in the mode of connectivity; and
launch one of the subset of the plurality of applications in an instance in which one of a plurality of selectable representations of the subset of the plurality of applications is selected in a user interface generated by the at least one computing device, wherein the another subset of the plurality of applications is not rendered in the user interface.

16. The non-transitory computer-readable medium of claim 15, wherein the instructions are further configured to cause the computing device to at least:
render, in the user interface, a user interface element comprising an indication of the mode of connectivity; and
in an instance in which the user interface element is selected, update the user interface to include the plurality of selectable representations of the subset of the plurality of applications.

17. The non-transitory computer-readable medium of claim 15, wherein the instructions are further configured to cause the computing device to at least:
determine that at least one of the plurality of applications is not launchable in the mode of connectivity;

wherein the subset of the plurality of applications does not include the at least one of the plurality of applications.

18. The non-transitory computer-readable medium of claim 15, wherein the instructions are further configured to cause the computing device to at least:

receive a command configured to cause the computing device to obtain launcher settings associated with launching the plurality of applications;

wherein the launcher settings comprise a passcode the computing device uses to secure an offline mode configuration of the computing device.

19. The non-transitory computer-readable medium of claim 15, wherein the instructions cause the computing device to transmit a plurality of requests to the health check locators.

20. The non-transitory computer-readable medium of claim 15, wherein the computing device determines that the subset of the plurality of applications is launchable in the mode of connectivity is based at least in part on application data of the subset of the plurality of applications comprising at least one association with the mode of connectivity.

* * * * *